United States Patent [19]

Fahl

[11] Patent Number: 4,766,305
[45] Date of Patent: Aug. 23, 1988

[54] OPTICAL SURFACE TEST APPARATUS FOR TESTING CONSTRICTED SURFACE AREAS

[75] Inventor: Christoph Fahl, Göttingen, Fed. Rep. of Germany

[73] Assignee: Feinprüf Feinmess and Prüferäte GmbH, Göttingen, Fed. Rep. of Germany

[21] Appl. No.: 88,856

[22] Filed: Aug. 24, 1987

[30] Foreign Application Priority Data

Sep. 4, 1986 [DE] Fed. Rep. of Germany ....... 3630124

[51] Int. Cl.⁴ ............................. H01J 3/14; G01J 1/20
[52] U.S. Cl. ....................................... 250/216; 250/201
[58] Field of Search ................ 250/201 AF, 216, 571, 250/572; 356/429–431, 445

[56] References Cited

U.S. PATENT DOCUMENTS 4,201,910 5/1980 Copeland et al. ................... 250/216
4,454,417 6/1984 May ...................................... 250/216
4,620,089 10/1986 Schlichting et al. ......... 250/201 AF

*Primary Examiner*—David C. Nelms
*Assistant Examiner*—Stephone B. Allen
*Attorney, Agent, or Firm*—Frishauf, Holtz, Goodman, Woodward

[57] ABSTRACT

To permit the testing of surfaces which have constricted access, such as grooves, bore holes and the like, a housing retains a laser light source, a collimator, a beam splitter and light detector. Light is reflected from the collimator, by a parallel offset dual parallelogram prism into an elongated hollow arm (8) which is pivotally mounted by a pivot axis (12) in the housing. The housing retains a positioning element (15) positioning the arm accurately with respect to the housing. A position transducer or sensing means senses repositioning of the housing to maintain the light spot from the laser, which is projected into the arm and outwardly thereof at right angles through an objective lens in focus. If the profile changes, the reflected light spot changes position on the light detector which controls the positioning system (15) to reposition the arm to maintain focus. The repositioning movement is detected by the position sensing or deflection transducer, which provides an output signal, representative of the change in profile on which the light spot is focussed.

17 Claims, 3 Drawing Sheets

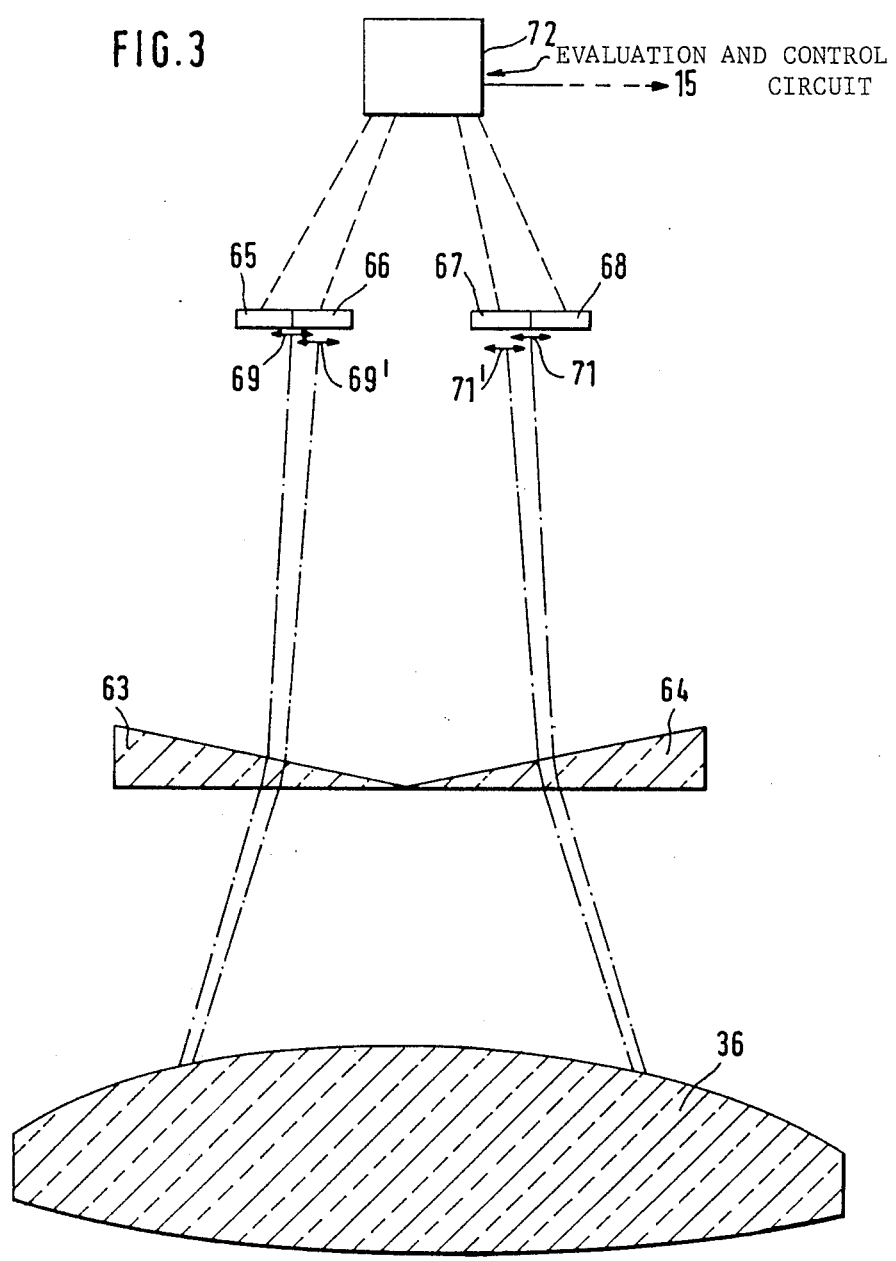

OPTICAL SURFACE TEST APPARATUS FOR TESTING CONSTRICTED SURFACE AREAS

The present invention relates to an optical surface test apparatus and more particularly to an apparatus which is small and can detect and test the surface configuration of an object in which axis to the surface of the object is constricted, for example the inside of a tube, or bore hole.

BACKGROUND

Various types of optical test apparatus are known, which project a beam of light against a surface, and then checks the reflected or return beam. Such apparatus operates contact-less, and is used, for example, to check the surface characteristics of an object, such as a workpiece in the micrometer range. Modern types of such apparatus utilize optical systems whicn are well-known and commercially available from compact disk (CD) players. CD players utilize light pens, secured in a housing of the apparatus. An objective is located close to the facing ends of the housing, movable between two spaced leaf springs along the optical axis. The objective is focussed by an electrodynamic drive system which shifts the objective counter the spring action of the leaf springs along the optical axis until a predetermined level of focussing is obtained. Focussing is checked by the light pen by using a plurality of photo-transducers, such as photo-diodes or photo-transistors. The image of an illuminated spot, derived for example from a laser, is projected by the objective and a collimator on a surface over which the plurality of photo-diodes or photo-transistors are distributed. The light source projects a beam of light from a laser through the collimator and the objective on the surface to be tested. The image of the light spot is enlarged on the photo-diodes, with respect to the light spot projected on the test surface in order to obtain high resolution.

Changes in focus occur if the height profile of the test object changes upon focussing of the objective. Such changes in focussing are then compensated by repositioning of the objective lens. The extent of repositioning of the objective then will be a measure for the height or level dimension of the profile of the test object at tne spot where it is illuminated by the light beam from the laser.

The deflection of the objective is measured by a distance measuring apparatus which, also, is contact-less and operates inductively. An armature is provided, which moves parallel to the optical axis of the objective.

A construction well-known in the prior art provides for emmission of the test beam at one of the facing ends of the housing. This arrangement restricts use of the apparatus to comparatively large, plane surfaces. Edges or rims interfere if they have a lesser spacing from each other than the cross-sectional dimension of the housing, measured at right angles to the optical axis. The apparatus is not capable of measuring the surface configuration of openings, for example in tubes, or bore openings having a diameter which is less than the height of the housing.

Placing the drive arrangement for the objective close to the objective causes heat effects to occur which, in use of the system for CD players, is not critical; when used as a testing or measuring element, however, such heating effects may introduce measurement errors.

THE INVENTION

It is an object to provide a surface test apparatus in which the surface configuration of constricted areas can be tested, for example walls of narrow grooves, recesses, bore openings or tubular openings of small diameter and the like; and which is accurate regardless of time of use by being essentially insensitive to changes in temperature in some of the components of the system.

Briefly, a tubular, hollow, elongated support arm projects from a housing. The support arm supports the objective lens at an outer or forward end portion of the arm. The arm is pivotally supported in the housing at a rearward end thereof to permit pivotable movement of the arm about an axis transverse to the longitudinal extent of the arm. The arm retains a right-angle deflection mirror, to provide for right-angle deflection of light from a light source, typically a laser, located within the housing. The light from the source is projected through a collimator and a beam splitter, both located within the housing in the region of the rearward portion of the arm. Likewise, a light detector array is located close to the rearward section of the arm. A light projection arrangement projects the beam of light from the collimator lens into the hollow arm and towards the deflection mirror. A positioning means and a position sensing means are located in the housing, operatively coupled to the inner or rearward end portion of the arm and positioned kinematically between the housing and the arm, to deflect the arm, and to sense the deflection distance.

The system has the advantage that the tubular arm, from which the measuring light beam is projected laterally, can be placed in narrow, confined spaces, such as bore holes, or similarly restricted zones of a workpiece; it is only necessary that the spacing between the limiting walls at the measuring surface is slightly greater than the outer diameter of the arm. This outer diameter of the arm can be substantially smaller than the remaining dimensions of the housing. It is possible, in this manner, to test the surface configuration and quality of bores having diameters as small as about 8 mm, that is, roughly ⅜ inch. The optical components which include the collimator, the light source, the light sensing array, and the beam splitter, do not interfere with testing; they are far removed from the actual sensing or testing location.

Focussing is carried out by pivoting the arm. Thus, the geometric relationships between the objective and the light source and the light detection array remain constant. Thus, no drive means need be located in the region of the objective, where they might cause heating, and consequent measuring inaccuracies. Rather, the drive means and distance sensing elements are located adjacent the rear end of the arm, where possible generation of heat does not influence the accuracy of measurement. The arm is preferably constructed as a hollow tube, which has high stiffness and can accurately follow the profile of the surface to be tested. The hollow arm also permits accurate projection of the light beam.

The drive to pivot the arm preferably is offset with respect to the arm. For fine focussing, it is thus possible to utilize powerful and hence comparatively large drive elements which are capable of providing substantial deflection forces, much higher than miniaturized drive arrangements located adjacent the objective. Thus, focussing can be carried out rapidly and accurately, and permits better following of the profile which is to be tested.

DRAWINGS

FIG. 3 is a schematic representation of the beam path of the test apparatus and illustrating the effect of optical wedges and the placement of photo-diodes.

DETAILED DESCRIPTION

Figure 1:
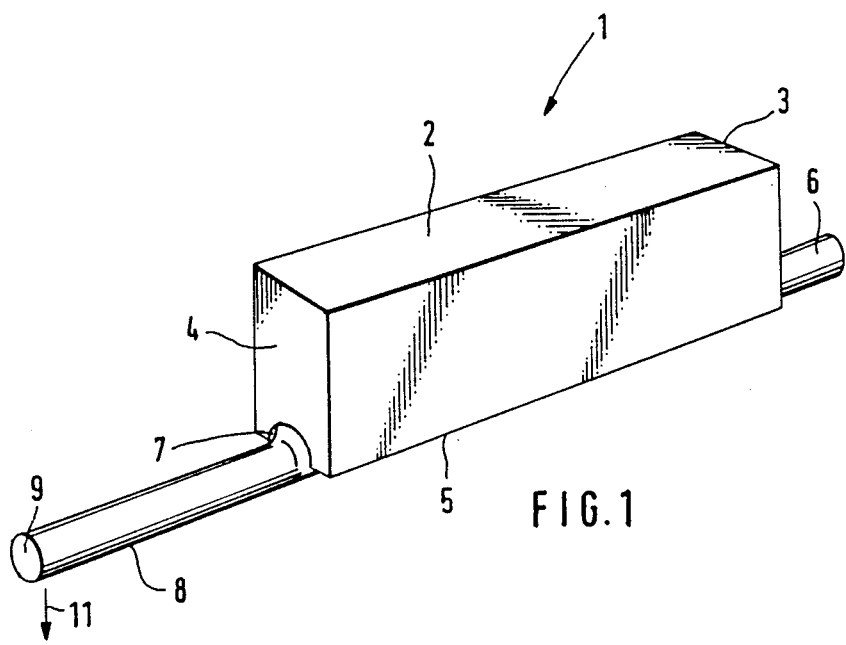
FIG. 1 is a perspective view of the testing apparatus of the present invention.

FIG. 1 illustrates generally the test apparatus 1 which tests the surface configuration or characteristics of a workpiece (not shown) by optical testing, that is, without mechanical contact with the workpiece. The test apparatus 1 has an essentially block-like elongated housing 2 defining two end faces 3 and 4 and a bottom face 5. A cylindrical attachment or holding pin 6 projects from the end face 3. Holding pin 6 is used to hold the apparatus securely in a clamping or holding arrangement, for example on a tripod or the like. The housing 2 is formed with an opening 7 in the end face 4 adjacent the edge of the lower wall 5. An elongated arm 8, having a front end 9, projects from the housing 2, extending parallel to the longitudinal direction of the housing. A beam of measuring light, schematically shown by arrow 11, can be projected outwardly of the arm 8, from a zone close to the front end 9; the reflected beam, that is, the beam reflected by the surface of a workpiece or the like, is then projected inwardly into the arm 8.

Figure 2:
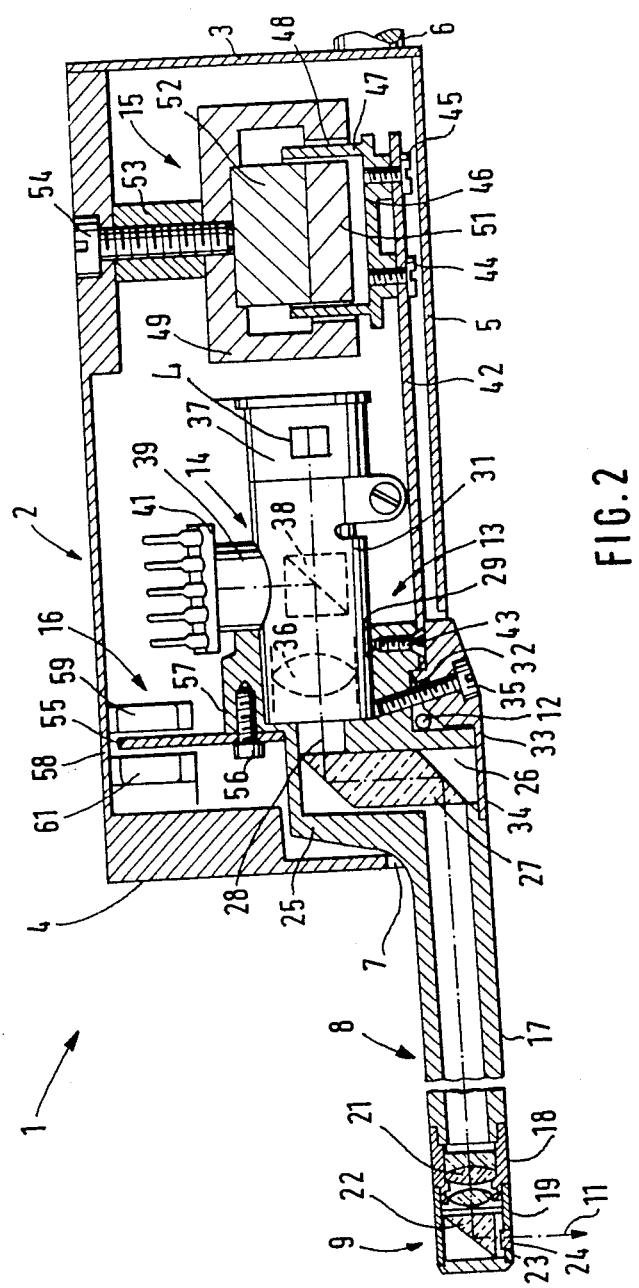
FIG. 2 is a longitudinal, sectional view through the apparatus through the optical axis thereof.

The arrangement in accordance with the present invention is best seen in FIG. 2 to which reference will now be made.

The lower surface 5 of the housing 2 is set back with respect to the surface of the arm 8 which includes the light beam exit and re-entrance opening 23. The arm 8 is retained within the interior of the housing so that it can carry out a limited pivotable movement transverse to its axis. The bearings or holding arrangement for the arm is preferably essentially free from play, hysteresis, and permits free and easy pivoting of the arm. Miniature ball or needle bearings are preferred, as well-known and frequently used in precision measuring elements. The pivot axis is illustrated in FIG. 2 at 12.

A light pen 14 is located within the interior of the housing 2, coupled to the rear end of the arm 8, and positioned behind the pivot axis 12. The light pen 14 generates the required measuring light beam and includes evaluation elements which evaluate the light reflected from the surface of the test object or workpiece. A drive arrangement 15 provides pivoting movement for the arm 8. The extent of pivoting or deflection of the arm 8 is measured by a distance transducer 16.

For ease of manufacture, the arm 8 is preferably constructed of a plurality of coaxial tubular elements 17,18,19, each having the same outer diameter, and fitting telescopically, in part, within each other. The tubular element 18 is fitted on the end of the elongated arm portion 17 on which a terminal portion 19 is fitted. The tubular portion 18 retains a multi-element or multi-lens objective 21 having a short focus distance. The tubular element 18 forms the socket for the lens system 21. The end of the portion 18, remote from the housing 2, has the portion 19 fitted thereto and secured thereon. Portion 19 retains a deflection mirror, in form of a Porrow prism 22, which deflects the light passing through the objective 21 laterally to a light exit opening 23 in the tubular portion 19. An optically flat glass plate 24 of suitable diameter closes off the opening 23. Due to the dimensional relations, objective 21, or the objective lens system 21, is so designed that the spacing between the center of the last lens element and the image plane is longer than the focal length, which is measured between the rear main plane and the image plane.

The tubular section 17 smoothly merges, as a unitary element, with a holding block structure 25 in the end close to the housing. The holding block structure 25 extends upwardly within the housing. Downwardly, block 25 does not extend beyond the circumference of the tubular portion 17 of the arm 8. The structure 25 has a blind bore 26, extending from the bottom. The axis of the blind bore 26 cuts perpendicularly the axes of the arm portions 17,18 and 19 which, as noted before, are coaxial. A parallelogram prism 27 is located in the bore 26; the parallelogram prism has one light entrance/exit opening facing the inner space of the tubular portion 17 of the arm 8. The other light exit/entrance opening of the prism 27 faces a stepped opening formed in the block 25. The axis 28 of the stepped opening intersects the axis of the blind bore 26 at a right angle. The wider portion 29 of the stepped opening receives a housing 31 of the light pen 14.

A rectangular recess 32 is formed in the block 25 below the stepped bore having the axis 28. The pivot axis 12 is held by a cover 33, closing off the recess 32 and, further, closing off the blind bore 26 which is open at the bottom. Screw 35 retains the cover 33 in position, screwed into a suitable tapped opening formed in the block 35. The cover 33 is so arranged that it does not project over the outer circumference of the tubular 17 of the arm 8.

The light pen 14 can be of standard construction used, for example, in CD players. Generally, such a light pen has a two-part housing 31, forming a general T-shaped construction. A collimator 36 is located in the forward end of the housing 31, that is, the end fitted in the larger opening 29 of the stepped bore. The rear portion of the housing 31 retains a light source in form of a laser structure generally shown at L, positioned with associated equipment in the housing portion 37, forming, together, a laser light source. A beam splitter 38 is located between the laser light source 37 and the collimator 36. The beam splitter projects the return light from the object - or, at least a substantial portion thereof, at a right angle upwardly into a tubular extension 39. A plurality of surface photo-diodes are located in the focal plane of the collimator 36. The photo-diodes are located in a standard DIL housing 41.

The laser L preferably is a semiconductor laser diode, operating in the visible light range. The light exit surface of the laser L within the housing portion 37 is in the focal plane of the collimator 36.

For adjustment, the beam splitter 38, as well as the laser L, can be located in the housing 31 to be both rotatable and longitudinally slidable, as well-known in structures of this type. After adjustment, the adjusted position can be locked.

In accordance with a feature of the invention, the arm 8 is moved by a lever 42 secured to the block 25, and positioned between the cover 33 in the block 25. A screw 43 retains the lever 42 in position. Lever 42 extends generally in the alignment with a prolongation of the tubular portion of the arm 8. At the remote end of the arm 8, two screws 44,45 retain a coil holder 46, which retains a coil form 47. The coil form 47 has windings placed thereon which have been omitted from the drawing for clarity. The coil form 47 extends in the ring-shaped cylindrical air gap 48 of a magnet yoke, located between a permanent magnet 52. An essentially radially directed magnetic field will thus permeate the air gap 48.

The magnetic yoke 48,51 is secured to the housing 2, by a screw 54 extending through a spacer 53 and into the yoke portion 49.

The magnetic yoke 49,51, together with a permanent magnet 52 and the coils wound on the winding form 47, form the drive arrangement 15 to pivot the arm 8 about the pivot axis 12.

The degree of pivoting movement is sensed by the distance transducer 16 which is constructed as a flat ferromagnetic element 55, secured by a screw 56 on a projection 57 of the block 25. The plate-shaped ferromagnetic element 55 extends radially with respect to the pivot axis 12, and is in general alignment therewith. The ferromagnetic element 55 is guided in an air gap 58 to form a differential transducer with respect to a pair of core elements 59,61. The differential transducer 59,61, of standard and well-known construction, is coupled to well-known electronic circuitry, customary in measuring technology for distance or displacement transducers. The air gap 58 is large enough so that the ferromagnetic element 55 may follow the pivoting movement of the arm 8 without physically engaging either one of the opposite core surfaces of the core elements 59,61 of the differential transducer. Ordinarily, the measuring stroke of the surface to be considered may be only a few tenths of a millimeter. Thus, only little spacing of the elements 55 is necessary within the air gap 58.

The entire arrangement of the arm 8 and the housing is so dimensioned that the arm 8, together with its associated elements including the block 25 and the coupled optical system, as well as the arm 42, the drive system 15 to the extent it is coupled to the arm, and the ferromagnetic element 55 of the displacement transducer 16, are in static balance. In other words, the arm will retain any position into which it is moved by the drive arrangement 15 when, after displacement of the arm, current to the winding on the coil carrier 47 is disconnected. Wiring to the coil, as well as to the electrical components within the optical system 14, is so conducted and so arranged that practically no torque is applied on the arm 8, in other words, the static balance of the arm 8 is maintained at any position.

OPERATION

The housing 2 is locked in an appropriate position by securing it to a sturdy support, such as a tripod or the like. The apparatus is so placed that the light transmission opening 23 is so placed that light passes perpendicularly on the surface to be tested, so that the optical axis of the entire optical system is vertical with respect to the test surface. The longitudinal axis of the arm 8 will then be positioned at least approximately parallel to the surface to be measured. The arm 8, preferably, before starting measurement, is located within the housing 2, approximately in the middle of its possible excursion path, determined by its deflection angle. This deflection angle is limited, essentially, by the movement of the ferromagnetic element 55 in the air gap 58. In this measuring position, then, the arm 8 projecting from the housing 2, is roughly, at least, parallel to the longitudinal extent of the housing 2.

The laser light system 37 is then energized. Light is passed from the laser L through the beam splitter 38 to the collimator 36. The light then emerges from collimator 36 as a parallel light beam, is deflected by the prism 27, and reaches the space within the arm 8 still within the housing 2; then, passing through the arm 8, it will impinge on the face of the objective 21, closest to the housing 2.

The optical axis of the objective 21 is offset with respect to the optical axis of the collimator 36 by the prism 27. The objective 21 collects the light to a focussing point. The Porrow prism 22, located immediately behind the exit lens element or pupil of the objective 21, deflects the light beam, now in conical form, radially from the arm 8, through the light transmission opening 23. The illuminated surface of the laser, typically a laser diode L, and located within the housing portion 37, is thus projected to the surface of the test object or workpiece. The light spot which can be generated will have cross-sectional dimension of under, or less than 1 micrometer, which means that the light point image will fit within a circle having a diameter smaller than 1 micrometer.

The light impinging on the surface of the test object or workpiece is reflected, and enters through the light transmission opening 23 back into the arm 8. The mirror surface or reflecting surface of the Porrow prism 22 reflects the light back into the arm 8 towards the objective 21. The objective 21 forms an image of the light spot at infinity when the light spot is at the focal point of the objective. Consequently, the interior of the arm 8 will have parallel light beams passed therethrough, directed from the objective 21 to the deflection prism 27 and then to the collimator 36. Due to the presence of the collimator, a rear image of the light spot on the surface of the test object will be obtained.

The beam splitter 38, located in a path of the beam between the collimator 36 and the laser light source, deflects the reflected light upwardly to the photo-diodes in the housing 41. The light spot, then, is projected on the photo-diodes by means of the objective 21 and the collimator 36 in enlarged form.

The reproduction of the light spot is only sharp when the objective 21 is properly focussed with respect to the spot on the surface to be tested at which the light spot, which is reflected, will occur.

In accordance with a feature of the invention, focussing is controlled—as illustrated in FIG. 3.—by means of two optical wedges 63 and 64 which are located in the path of the beam between the collimator 36 and four photo-diodes 65,66 and 67,68, forming a photo-diode array. The two optical wedges 63,64 are so positioned that their tips or apices lie on the optical axis of the collimator 36. For ease of illustration, the beam splitter has been omitted from FIG. 3, and it is here assumed that the optical axis of the collimator 36 is likewise rotated 90°, and extends vertically. Only the reflected light is here involved. The two optical wedges 63 and 64 generate two separate images of the light spot in the image plane, as seen by the two double arrows 69,71 in FIG. 3, if the wedge angles and the indices of refraction are appropriately selected. These images occur at the respective locations when the light spot is properly located at the focal point of the objective 21.

The light sensitive junction layers of the photo-diodes 65,66,67,68, shown only schematically in FIG. 3, are located as close as possible exactly where the two real images 69,71 occur if the objective 21 is properly focussed. The arrangement is such that a portion of the image 69 falls in part on the photo-diode 65 and on the photo-diode 66. The two photo-diodes 67 and 68 are so located that the image 61 is on the photo-diode 67, as well as in part on the photo-diode 68. The lateral offset of the photo-diodes is so selected that the photo-diode 66 will receive from the image 69 precisely as much light as the photo-diode 67 on the image 71. Further, the photo-diode 65 and 68 will receive from the respective images also equal quantities of light. The output signals of the photo-diode 66 and 65 will then be the same, and the output signal of the photo-diodes 65 and 68 will then, also, be the same. To be able to determine proper focussing, the arrangement is so positioned that, when the light spot from objective 21 is in precise focus, preferably, the outputs of all the photo-diodes 65 to 68 is the same - provided the objective 21, of course, is in focus with respect to the reflected light spot. Let is now be assumed that the light spot projected backwardly from the objective 21 is reflected from a distance which is further removed than the focal point, in other words, the light spot is located beyond, or behind the focal point. In this case, the real images, due to the optical wedges 63 and 64, will have the tendency to move towards each other. Additionally, the region of greatest sharpness will begin to appear forwardly, or in front of the junction layers of the photo-diodes 65 and 68. This condition is illustrated in FIG. 3 by the real images 69' and 71'. As can readily be seen, the previously focussed condition of the adjacent photo-diode 66 and 67 no longer pertains; with respect to the previously described focus condition, the adjacent photo-diodes 66 and 67 will receive more light than the farther removed photo-diodes 65 and 68. This will cause a shift of the output signals from the respective photo-diodes. The output signals are evaluated in an evaluation-and-control circuit 72. This evaluation-and-control circuit then controls the drive system 15 in such a direction to pivot the arm 8 to re-establish the prior conditions of equilibrium in which all photo-diodes 65 to 68 generate the same output signal. The arm is pivoted, thus, in the direction towards the desired balance conditions. As the arm moves into balanced condition, the images of the light spot will again travel towards the outside until they have reached the positions shown by the arrows 69 and 71 in FIG. 3.

If the real images of the light spot are further outwardly, for example if the surface on which the light spot impinges is closer to the objective 21 than the distance to the focal point, the reverse situation will occur and the balance of light will be disturbed so that the outer photo-transducers 65,68 will receive more light than the inner ones 66,67. This signal condition is again evaluated in circuit 72 which controls the drive system 15 in the direction opposite to that previously discussed, that is, the arm 8 is moved away from the surface to be tested until balanced conditions in which the light beam is centered on the respective photo-diodes, is again obtained.

The system and method of electro-optically testing surfaces as described is highly sensitive and permits determination of differences in level in the profile of a test surface which are in the nanometer range.

As can be seen, the photodiodes 65-68 need not be positioned exactly in the focal plane since only relative change of the signals is being evaluated and causes control movement. Thus, relative change of the signals is appropriately and correctly sensed, even if the photodiodes 65-68 are closer to the collimator 36, or farther removed than would correspond to its focal distance.

Movement, that is, pivoting of the arm as a result of re-establishing balanced conditions at the photo-diodes, is sensed by the displacement transducer 16. Thus, the output signal from the displacement transducer 16 will be representative of the shape of the profile of the test surface. Light which is emitted from the light passage opening 23 and which does not impinge at right angle with respect to the optical axis of the opening 23, causes repositioning of the arm 8, so that the light will impinge on the test surface at right angles. Thus, to maintain balanced conditions on the signals from the photo-diodes 65-68, arm 8 is continuously controlled to follow the profile of the surface on which the light is directed. The control movement follows exactly the profile of the surface if the arm and the test surface are moved relatively, for example by longitudinal shift, or rotation of a test bore.

The relative weights of the components coupled to the arm 8, that is, the optical system within block 25, the displacement transducer 16, and the drive unit 15 are so related to the weight of the arm 8 and its optical component, that the arm 8 is at least in static balance with respect to its pivot axis 12. When this condition pertains, the drive system 15 need not contain any elements for stopping or holding the arm in position, or generate a holding torque. It is then only necessary to energize the drive system 15 if the position of the arm 8 is to be changed. After the arm has reached the position in which the photo-diodes 65-68 again provide a balanced output signal, that is, when the light spot is again in focus with respect to the reflecting workpiece surface, the drive system 15 can be de-energized. The deflection of the arm from the prior condition, of course, is sensed by the displacement transducer 16, which provides an electrical output coupled to a suitable amplifier and output circuit from which the displacement can then be obtained.

The apparatus can be used not only in highly restricted surfaces, but can be equally used to determine the surface conditions of large areas. The arm extends as a prolongation of one of the circumferential sides of the housing. The lower edge of the arm is preferably located slightly below the lowest edge of the housing, as best seen in FIG. 2; for mere surface testing, the lower edge of the arm 8 and the lower side 5 of the housing 2 can be flush.

The angled position of the light beam, due to the prism 27, reduces interference of structural elements within the housing with the light beam and its projection into the arm. The light pen unit 14, and associated components, is comparatively large, that is, in comparison to the diameter of the arm 8 for example. The deflection of the light beam by the prism 27, which, in its simplest manner is merely a parallel offset, permits positioning of the light pen, the drive unit 15 and the displacement transducer 16 in a most convenient and accessible manner within the housing 2. A parallelogram prism 27, as shown, is simple; other equivalent elements, such as two Porrow prisms may be used.

The objective 21 has preferably as short and a focal length as possible and, therefore, is preferably located at the forwardmost end of the arm 8 so that the focal intercept distance of the objective lens system need not depart much from its focal length. Placing the objective 21 in longitudinal direction in the arm between the deflection mirror and the light pen preferably uses an objective lens system having a focal intercept distance which is longer than the focal length of the optical system. It is, of course, possible to place the deflection mirror in the beam path within the objective, so that the optical axis of the last lens of the objective extend at right angle to the longitudinal axis of the arm. If this modification is used, the light transmission opening of the arm is tightly closed directly by the objective lens. Closing of the light transmission opening is desirable to prevent ingress of dust, dirt, or other contaminants into the interior of the arm 8.

The arrangement shown in FIG. 2, in which the lens system 21 is located, with respect to the light from the laser 37 in advance of the prism 22, has a manufacturing advantage since the entire objective system can be secured in a single socket which is then attached to the arm 8, without any deflection of the light beam itself, and the deflecting element is then located in an additional attachment sleeve. This facilitates manufacture, adjustment and calibration.

The displacement transducer 16 preferably has plane, flat pole surfaces which define a gap 58 in which the ferromagnetic vane, or disk 55 is positioned. Preferably, the gap is positioned essentially radially with respect to the pivot axis 12 of the arm 8. This radial position with respect to the pivot axis of the arm 8, results in a structure which can be made with substantial tolerances, and thus is non-critical with respect to its measuring behavior. Even if the assembly of the displacement transducers 16 involves mounting tolerances, no danger arises that any movable part may impinge, or touch a stationary part. This is important in preventing erroneous measurements, and the apparatus becomes highly resistant against damage due to shock or vibration.

The drive system 15 to pivot the arm 8 is, as described, preferably, a coil winding which can be energized, operating within a magnetic shield. Use of such a winding within the housing, and located, for example in a prolongation of the arm, results in a structure in which the components coupled to the arm can be made of lightweight material. The arm itself, thus, can be made light and readily balanced. The moment of inertia of the arm and the coupled elements are not essentially increased by the drive system. In the interest of low inertia, also, the light pen is located as close to the pivot axis as possible. The heavier light pen, as shown in FIG. 2, thus is positioned closer to the pivot axis 12 than the moving coil structure 46,47 of the drive system 15 with respect to the pivot axis 12. Lever arm 42 provides balance and movement proportioning, so that the arm 2 and lever 42 with pivot 12 between, together form a 2-arm lever system.

Various other changes and modifications may be made within the scope of the inventive concept.

I claim:

1. Optical surface test apparatus having
   a housing (2);
   a light source (L,37) generating a beam of light;
   a collimator lens (36), the light source being located in the focus of the collimator lens;
   a light detector (39,41);
   a beam splitter (38) located in the path of the beam of light from the source through the collimator lens and splitting a return beam for directing the return beam to the light detector;
   an objective lens (21) in the path of light from the collimator lens (36) for focussing the light on the surface of a test object and receiving reflected light therefrom;
   positioning means (15) coupled to the objective lens for changing the spacing between the objective lens and the test object and for focussing the light from the objective lens; and
   a position sensing means (16) coupled to the objective lens for measuring the change of spacing of the objective lens with respect to the test object,
   comprising, in accordance with the invention, a tubular, hollow, elongated support arm (8) projecting from the housing (2) for supporting the objective lens (21) at an outer or forward end portion (9);
   pivot means (12) located in a housing (2) and supporting the inner or rearward end portion (13) of the arm for pivotal movement of the arm about an axis transverse to the longitudinal extent of said arm;
   a right-angled deflection mirror (22) located within said arm;
   a light transmission opening (23) located at said forward portion of the arm and transmitting light from said mirror to a test object and reflected light from the test object to said mirror for passage through the objective lens (21) and longitudinally into the arm;
   the light source (L,37), the collimator (36), the beam splitter (38) and the light detector (39,41) being located on an inner or rearward portion of the arm;
   light projection means (27) for projecting the beam of light from the collimator lens into the hollow arm and towards the deflection mirror (22); and
   wherein the positioning means (15) and the position sensing means (16) are located within the housing, operatively coupled to the inner or rearward end portion of the arm and positioned kinematically between the housing (2) and said arm (8).

2. The apparatus of claim 1, wherein the arm is at least in static balance about a pivot axis defined by said pivot means (12).

3. The apparatus of claim 1, wherein the housing has circumferential limit size;
   and wherein the arm (8) extends in prolongation of one (5) of said circumferential limit sides, and said one limit side and a side portion of the arm being positioned flush, or recessed with respect to the side of the arm which includes the light transmission opening (23).

4. The apparatus of claim 1, wherein the position sensing means, the light source (37,L), the beam splitter (38), the light detector (39,41) and the collimator (36) are positioned within the housing (2).

5. The apparatus of claim 1, wherein the light projection means (27) include a light deflection element (27) deflecting the optical axis in the path between the deflection mirror (22) and the beam splitter (38).

6. The apparatus of claim 1, wherein the light projection means (27) include a parallel light beam multiple deflection element to reposition the optical axis between the deflection mirror (21) and said element, and the optical axis between said element and the beam splitter (38), for parallel off-setting the respective optical axes passing through the arm and extending within the housing between the collimator lens and the beam splitter.

7. The apparatus of claim 1, wherein the objective lens (21) is located closely adjacent the outer, or forward end portion (9) of the arm.

8. The apparatus of claim 1, wherein the objective lens (21) has a focal length which is shorter than its focal intercept distance.

9. The apparatus of claim 1, wherein the position sensing means (16) comprises a differential transducer (59,61) having an air gap (58);

and a ferromagnetic element (55) coupled to the arm, is movable within the air gap, the air gap being positioned to extend essentially radially with respect to a pivot axis defined by said pivot means (12), said ferromagnetic element being movable in said air gap and extending essentially radially with respect to said pivot axis.

10. The apparatus of claim 1, wherein the light source (L,37) comprises a laser.

11. The apparatus of claim 1, wherein the light detector (39,41) comprises a plurality of photo-sensitive semiconductor elements (65,68), located at least approximately in the focal plane of the collimator (36);

and optical wedges (63,64) are provided, positioned in the path of light between the collimator (36) and the light detector, and splitting the beams of light between respective photo-sensitive semiconductor elements while directing said beams of light to said photo-sensitive semiconductor elements.

12. The apparatus of claim 1, wherein said light transmission opening (23) is closed by a light transmissive closure (24).

13. The apparatus of claim 1, including a lever arm (42) coupling the positioning means (15) to the arm or rearward end portion of the arm to form together with the arm a double-arm lever system.

14. The apparatus of claim 1, wherein the positioning means (15) comprise a movable coil drive system having means (49,51,52) for generating a static magnetic field, secured in the housing (2);

and a movable coil system (46,47) coupled to the arm (8) at a prolongation thereof, movable within said static magnetic field.

15. The apparatus of claim 1, further including an arm extension element (42) coupled to said arm (8) and carrying part of said positioning means;

and wherein said positioning means includes an air gap, said part being operable in said air gap for contact-less positioning of the arm.

16. The apparatus of claim 14, wherein said means for generating the static magnetic field defines a ring-shaped or toroidal air gap;

and said movable coil system includes a movable coil carrier (47) operable within said air gap.

17. The apparatus of claim 15, wherein the arm is at least in static balance about a pivot axis defined by said pivot means (12).

* * * * *